(12) United States Patent
Horley et al.

(10) Patent No.: US 9,348,688 B2
(45) Date of Patent: *May 24, 2016

(54) CORRELATING TRACE DATA STREAMS

(71) Applicant: ARM LIMITED, Cambridge (GB)

(72) Inventors: John Michael Horley, Cambridge (GB); Paul Anthony Gilkerson, Cambridge (GB); Michael John Gibbs, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/185,121

(22) Filed: Feb. 20, 2014

(65) Prior Publication Data

US 2014/0229771 A1 Aug. 14, 2014

Related U.S. Application Data

(63) Continuation-in-part of application No. 13/067,168, filed on May 13, 2011, now Pat. No. 8,713,375.

(30) Foreign Application Priority Data

Jun. 21, 2010 (GB) .................................. 1010333.1

(51) Int. Cl.
*G06F 11/00* (2006.01)
*G06F 11/07* (2006.01)
(Continued)

(52) U.S. Cl.
CPC ............ *G06F 11/079* (2013.01); *G06F 11/348* (2013.01); *G06F 11/364* (2013.01); *G06F 11/3664* (2013.01)

(58) Field of Classification Search
CPC .... G06F 11/261; G06F 11/25; G06F 2201/88
See application file for complete search history.

(56) References Cited

U.S. PATENT DOCUMENTS

| 7,606,999 | B2 | 10/2009 | Agarwala |
| 8,055,950 | B2 | 11/2011 | Houlihane et al. |
| 2003/0018929 | A1 | 1/2003 | Bardsley et al. |

(Continued)

FOREIGN PATENT DOCUMENTS

| CN | 101398782 | 4/2009 |
| GB | 2 371 897 | 8/2002 |

(Continued)

OTHER PUBLICATIONS

English translation of Chinese Office Action dated Sep. 2, 2014 in CN 201110184081.1, 21 pages.

(Continued)

*Primary Examiner* — Charles Ehne
(74) *Attorney, Agent, or Firm* — Nixon & Vanderhye P.C.

(57) ABSTRACT

A data processing apparatus is provided with trace circuitry for generating a plurality of trace streams including an instruction trace stream 10 and a data trace stream 12. The instruction elements within the instruction trace stream and the data elements within the data trace stream are marked with key values KV such that a match may be made between data elements and corresponding instruction elements. When predetermined conditions are met, synchronization markers 66 are inserted in both the instruction trace stream 10 and the data trace stream 12 in order to permit a precise correlation to be made between the instruction elements and the data elements when the data is subsequently analyzed.

28 Claims, 14 Drawing Sheets

(51) Int. Cl.
*G06F 11/36* (2006.01)
*G06F 11/34* (2006.01)

(56) References Cited

U.S. PATENT DOCUMENTS

| | | | |
|---|---|---|---|
| 2003/0154028 A1 | 8/2003 | Swaine et al. | |
| 2004/0117770 A1* | 6/2004 | Swoboda et al. | 717/128 |
| 2004/0133824 A1* | 7/2004 | Swoboda et al. | 714/39 |
| 2004/0153813 A1 | 8/2004 | Swoboda | |
| 2004/0170169 A1 | 9/2004 | Swoboda et al. | |
| 2005/0039078 A1 | 2/2005 | Bradley et al. | |
| 2006/0255974 A1 | 11/2006 | Swoboda et al. | |
| 2006/0259831 A1 | 11/2006 | Sohm et al. | |
| 2007/0271448 A1 | 11/2007 | Agarwala | |
| 2008/0256339 A1 | 10/2008 | Xu et al. | |
| 2009/0125756 A1 | 5/2009 | Swaine et al. | |
| 2009/0183034 A1 | 7/2009 | Houlihane et al. | |
| 2009/0249302 A1 | 10/2009 | Xu et al. | |

FOREIGN PATENT DOCUMENTS

| | | |
|---|---|---|
| GB | 2 404 753 | 2/2005 |
| GB | 2 453 174 | 4/2009 |
| JP | 2005-56379 | 3/2005 |
| JP | 2005-56380 | 3/2005 |
| WO | WO 01/48607 | 7/2001 |

OTHER PUBLICATIONS

Japanese Office Action dated Sep. 22, 2014 in JP 2011-135115 and English translation, 7 pages.
UK Search Report for Application No. GB 1010333.1, dated Oct. 5, 2010.
UK Search Report for Application No. GB 1010333.1, dated Feb. 22, 2011.
The Nexus 5001 Forum™ Standard for a Global Embedded Processor Debut Interface, Version 2.0, (Dec. 23, 2003), 166 pages.
"Embedded Trace Macrocell", Architecture Specification, ETMv1.0 to ETMv3.4, 476 pages.
"PDtrace™ Interface Specification", MIPS Technologies, Document No. MD00136, Revision 2.07, (Mar. 21, 2002), 46 pages.
English translation of Chinese Second Office Action issued Apr. 13, 2015 in CN 201110184081.1, 23 pages.
English translation of Chinese Third Office Action issued Oct. 21, 2015 in CN 201110184081.1, 4 pages.

* cited by examiner

CORRELATING TRACE DATA STREAMS

This application is a continuation-in-part of U.S. application Ser. No. 13/067,168 filed 13 May 2011, which claims priority to GB filed 1010333.1 filed 21 Jun.2010, the entire contents of each of which are hereby incorporated by reference.

BACKGROUND OF THE INVENTION

1. Field of the Invention

This invention relates to the field of data processing systems. More particularly, this invention relates to the field of trace streams generated and analysed so as to assist in the diagnosing the behaviour and the debugging of data processing systems.

2. Description of the Prior Art

It is known to provide data processing systems including tracing circuitry coupled to the processing circuitry and configured to generate a trace data stream indicative of processing operations performed by the processing circuitry. An example of such systems are the integrated circuit designs produced by ARM Limited of Cambridge, England which include a processor core and an embedded trace macrocell (ETM) coupled to the processor core to generate a stream of trace data. This trace data may be buffered on-chip prior to being sent off-chip for analysis. The analysis may utilise a general purpose computer reading the trace data stream and interpreting the trace data stream to reconstruct the processing operations which gave rise to that trace data stream.

The provision of multiple trace streams (e.g. as provided by the CoreSight funnel mechanisms designed by ARM Limited of Cambridge, England), such as, for example, an instruction trace stream and a data trace stream, can have a number of advantages. These include the ability to easily filter between instructions and data. The tracing mechanisms may also be more readily set up to handle instructions and data differently. A trace stream decompressor may be configured to decode the instruction stream and only decode the data stream when necessary. Having a dedicated instruction trace stream and a dedicated data trace stream will also typically reduce the amount of header space required within each stream thereby yielding improvements in bandwidth. The tracing circuitry may employ separate first-in-first-out memories and permit use of disproportionately smaller input stages. The separate instruction trace stream and data trace stream also allows greater flexibility in overflow behaviour, such as permitting a loss of the data trace stream to occur without loss of the instruction trace stream. Furthermore, data trace suppression (i.e. mechanisms to stop generation of trace data relating to data values being processed) need not be explicitly provided since the data trace stream can be ignored if it is not required.

SUMMARY OF THE INVENTION

Viewed from one aspect the present invention provides an apparatus for processing data comprising:

processing circuitry configured to perform processing operations in response to a stream of program instructions; and tracing circuitry coupled to said processing circuitry and configured to generate trace data indicative of said processing operations performed by said processing circuitry;

wherein said trace data comprises a plurality of separate trace streams including at least one first trace stream and at least one second trace stream and said trace circuitry is configured to insert a synchronisation marker in one of said at least one second trace stream to mark a synchronisation point which matches a known point in one of said at least one first trace stream;

wherein, in addition to insertion of said synchronisation marker, said trace circuitry is configured to mark individual elements within said plurality of separate trace streams with respective key values.

The present technique recognises that when multiple trace streams are provided a difficulty arises in supporting proper analysis of those trace streams. In particular, the correlation between elements within the trace streams may be difficult to determine in all circumstances. In order to assist in this, the present technique provides that the trace circuitry is configured to insert synchronisation markers in one of the first trace streams and one of the second trace streams to mark respective synchronisation points with matching positions within one of the first trace streams and one of the second trace streams. In this way, when the trace streams are analysed, the synchronisation markers can be detected and an accurate correlation can be provided between the trace streams.

The plurality of trace streams may comprise a plurality of first trace streams. Where the at least one first trace stream is at least one instruction trace stream, a plurality of threads may operate and it may therefore be convenient to separate instruction elements into different instruction trace streams in dependence on the thread.

The plurality of trace streams may comprise a plurality of second trace streams. Where the at least one second trace stream is at least one data trace stream, each data trace stream may be used for a different type of data operation. For example, one data trace stream may be used for loading data and a second data trace stream may be used for the storing of data. As data paths in CPUs widen and as the number of transfers that can occur concurrently increase, the cost of a single data trace stream increases in a non-linear manner. Consequently, it may be appropriate to provide a number of different data trace streams that are correlated with a single instruction trace stream.

There may also be both a plurality of first trace streams and a plurality of second trace streams.

The known point within the at least one first trace stream may itself also be a synchronisation marker. Furthermore, the synchronisation marker in the at least one first trace stream may comprise a reference to one of the at least one second trace stream. In this way, when there are multiple second trace streams, it is possible to determine which of the multiple second trace streams is being referred to for a particular synchronisation marker in the at least one first trace stream.

Whilst multiple trace streams may be supported for a number of reasons, the technique is particularly useful when the at least one first trace stream is at least one instruction trace stream indicative of program instructions processed by the processing circuitry and the at least one second trace stream is at least one data trace stream indicative of data transfers between the processing circuitry and a memory system. Separate tracing of the instructions and the data is convenient for a number of reasons, such as those discussed above.

The interpretation of elements within a sequence of instruction elements is assisted if the elements are marked with respective key values.

The correlation of individual data elements with the instruction elements which gave rise to those data elements is assisted by marking the data elements with key values matching the key values of the corresponding instruction elements which gave rise to those data values or are associated with those data values.

The key values may comprise a plurality of sets of key values, with each set of key values in the plurality of sets of key values being used to mark individual data elements within the sequence of data elements in a different data trace stream. In other words, each set of key values may occupy an individual and separate namespace. In this way, the key values themselves may be reused, with the namespace being used to differentiate for which data trace stream a particular key value is used. Such an approach has the advantage that the keys within a particular data trace stream may be more sequential and therefore more compressible.

Alternatively, the key values may be used to mark individual data elements within said sequence of data elements in each of the at least one data trace stream. For example, the same set of key values may be used for every data trace stream in the at least one data trace stream. In other words, there may be only a single namespace for all of the key values used across the data trace streams.

Flexibility in the generation and processing of instruction elements and the data elements as well as the nature of a delay that can arise between an instruction starting to execute and the data relating to that instruction becoming available may be accommodated when the data elements and instruction elements having matching key values are permitted to have a variable offset between their respective positions within the at least one data trace stream and the at least one instruction trace stream. Thus, for example, an instruction element may be generated and placed in one of the at least one instruction trace stream when an instruction starts to execute and at a later time, when the data value is returned in accordance with a variable latency from a memory system, a corresponding data element with a matching key value is inserted into the at least one data trace stream.

The trace circuitry may be arranged to incrementally change the key values of the instruction elements between adjacent instructions. With such an arrangement the key values of the instruction elements will have a predetermined order within the at least one instruction trace stream.

In contrast to the predetermined order of the instruction elements within the at least one instruction trace stream and their incrementally changing key values, the data elements within the at least one data trace stream can have a variable order and data values may be returned to the system out-of-order with respect to the instructions element that are associated with those data values. Thus, a first instruction may issue a data load to a high latency memory. A second instruction executed later than the first instruction may then issue a data load to a low latency memory with the data value corresponding to the second instruction being returned prior to the data value associated with the first instruction, even though the first instruction started its execution earlier and has its instruction element appearing earlier within the at least one instruction trace stream. The key values provided for the data elements allow such out-of-order data elements to be appropriately matched with their corresponding instruction elements.

In order to preserve bit space within the at least one instruction trace stream and the at least one data trace stream the key values may be arranged to wrap within a predetermined range of key values thereby limiting the bit space which needs to be allocated to store the key values. The synchronisation markers inserted in accordance with the present technique facilitate this wrapping of the key values since the synchronisation markers permit synchronisation points within the respective trace streams to be identified even if the key values are ambiguous due to key value wrapping.

When a key value is being associated with a data element representing a data value that has been transferred, a determination is made as to whether or not the offset between the data element and its corresponding instruction element is so large that synchronisation markers should be inserted so as to assist a system seeking to decode the trace streams and remove any ambiguity in the relationship between data elements and instruction elements. In order to assist in this determination, there is associated a search space of adjacent instruction elements within the at least one instruction trace stream.

The search space is positioned relative to a last matched instruction element within the at least one instruction trace stream where the last match instruction element corresponds to the last appearing instruction element within the at least one instruction trace stream for which a matching data element has been formed within the at least one data trace stream. The search space thus forms a moving window within which key values may normally be matched without ambiguity and accordingly without requiring the overhead of inserting synchronisation markers into the respective trace streams.

The trace circuitry may be configured to insert synchronisation markers in response to a variety of different detected circumstances. One circumstance is that the trace circuitry detects a data element within the at least one data trace stream with a key value corresponding to a position within the at least one instruction trace stream earlier than an earliest instruction element within the search space. Another circumstance combines the above condition with a condition that the key value matches an instruction element corresponding to a position within the search space later than a most recently generated key value. These trigger conditions for insertion of the synchronisation markers help to address the situation in which a data element appears in the at least one data trace stream too late compared with its corresponding instruction element such that the unmatched corresponding instruction element has already moved out of the search space and accordingly there is an ambiguity if reliance is solely made upon the key values.

Another circumstance in which the trace circuitry is configured to insert synchronisation markers in both the at least one instruction trace stream and the at least one data trace stream is when the trace circuitry detects a data element within the at least one data trace stream with a key value corresponding to a position within the at least one instruction trace stream later than a latest instruction element within the search space. This trigger condition may be combined with the condition that the key value matches an instruction element positioned between an earliest instruction element within the search space and the last matched instruction element within the search space. These conditions correspond to the situation in which there is too large a gap between a data element and its corresponding instruction element and accordingly insertion of a synchronisation marker is appropriate as this will permit the circuitry which must interpret the trace streams to do this efficiently and without error.

Another circumstance in which the trace circuitry is triggered to insert synchronisation markers is when one more program instructions speculatively executed in the processing circuitry are cancelled such that corresponding instruction elements within the at least one instruction trace stream are cancelled. In this circumstance the cancelling of the instruction may be marked within the at least one instruction trace stream and then the key values of cancelled instruction elements will be reused. Insertion of synchronisation markers associated with the cancel operation removes any potential ambiguity when seeking to match a data element with an instruction element as there may be both an executed instruction element and a cancelled instruction element present within the at least one instruction trace stream. There may also be data elements with the same key, some of which correspond to before the cancel and some of which correspond to after the cancel.

Viewed from another aspect the present invention provides an apparatus for processing data comprising:

processing means for performing processing operations in response to a stream of program instructions;

tracing means coupled to said processing means for generating trace data indicative of said processing operations performed by said processing circuitry; wherein said trace data comprises a plurality of separate trace streams including at least one first trace stream and at least one second trace stream and said tracing means is configured to insert a synchronisation marker in one of said at least one second trace stream to mark a synchronisation point which matches a known point in one of said at least one first trace stream;

wherein, in addition to insertion of said synchronisation marker, said tracing means is configured to mark individual elements within said plurality of separate trace streams with respective key values.

Viewed from a further aspect the present invention provides a method of processing data comprising the steps of:

performing processing operations in response to a stream of program instructions;

generating trace data indicative of said processing operations performed; wherein said trace data comprises a plurality of separate trace streams including at least one first trace stream and at least one second trace stream and said step of generating inserts a synchronisation marker in one of said at least one second trace stream to mark a synchronisation point which matches a known point in one of said at least one first trace stream, and in addition to inserting of said synchronisation marker, marking individual elements within said plurality of separate trace streams with respective key values.

A complementary aspect of the present invention is a receiving apparatus for processing received trace data in accordance with the above described techniques. Thus, a further aspect of the present invention provides an apparatus for processing received trace data comprising:

receiving circuitry configured to receive trace data from a processing apparatus performing processing operations in response to a stream of program instructions; and analysis circuitry coupled to said receiving circuitry and configured to analyse said trace data; wherein said trace data comprises a plurality of separate trace streams including at least one first trace stream and at least one second trace stream and said analysis circuitry is configured to identify a synchronisation marker in one of said at least one second trace stream and a known point within one of said at least one first data stream, said synchronisation marker and said known point identifying respective synchronisation points with matching positions within said first trace stream and said at least one second trace stream, and in addition to said synchronisation marker, individual elements within said plurality of separate trace streams are marked with respective key values.

A further aspect of the present invention provides an apparatus for processing received trace data comprising:

receiving means for receiving trace data from a processing apparatus performing processing operations in response to a stream of program instructions; and analysis means coupled to said receiving means for analysing said trace data; wherein said trace data comprises a plurality of separate trace streams including at least one first trace stream and at least one second trace stream and said analysis means is configured to identify a synchronisation marker in one of said at least one second trace stream and a known point within one of said at least one first data stream, said synchronisation marker and said known point identifying respective synchronisation points with matching positions within said one of said at least one first trace stream and said one of said at least one second trace stream, and in addition to said synchronisation marker, individual elements within said plurality of separate trace streams are marked with respective key values.

A further aspect of the present invention provides a method of processing received trace data comprising:

receiving trace data from a processing apparatus performing processing operations in response to a stream of program instructions; and analysing said trace data; wherein said trace data comprises a plurality of separate trace streams including a first trace stream and at least one second trace stream and said step of analysing identifies a synchronisation marker in said at least one second trace stream and a known point within one of said at least one first data stream, said synchronisation marker and said known point identifying respective synchronisation points with matching positions within said one of said at least one first trace stream and one of said at least one second trace stream, and in addition to said synchronisation marker, individual elements within said plurality of separate trace streams are marked with respective key values.

The above, and other objects, features and advantages of this invention will be apparent from the following detailed description of illustrative embodiments which is to be read in connection with the accompanying drawings.

DESCRIPTION OF THE EMBODIMENTS

Figure 1:
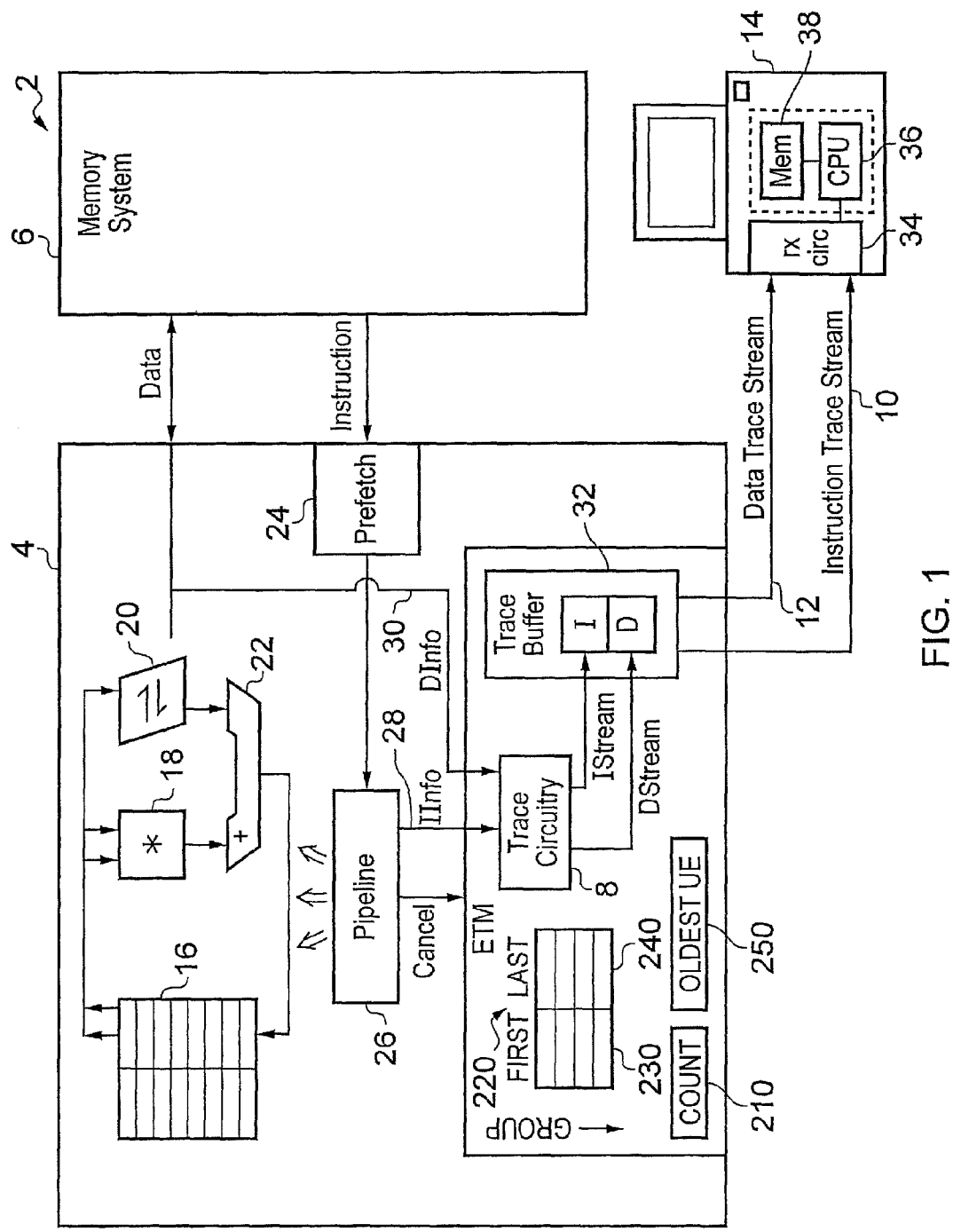
FIG. 1 schematically illustrates an apparatus for processing data including processing circuitry, a memory and trace circuitry.

FIG. 1 schematically illustrates an apparatus for processing data 2 including processing circuitry 4 coupled to a memory 6. The processing circuitry 4 includes tracing circuitry 8 generating an instruction trace stream 10 and a data trace stream 12 supplied to an apparatus for processing received trace data 14.

The processing circuitry 4 includes a processor core having a data path including general purpose registers 16, a multiplier 18, a shifter 20 and an adder 22. Program instructions fetched from the memory 6 via prefetch circuitry 24 are supplied to an instruction pipeline 26 where, in a decode stage, they generate control signals for controlling the data path 16, 18, 20, 22 to perform desired processing operations. These processing operations, in this example, include data transfers between the memory 6 and the processing circuitry 4. A data transfer may be in the form of a load of a data value to one of the registers within the register bank 16 or a store of one of the values within a register of the register bank 16 to the memory 6.

It will be appreciated that the processing circuitry 4 has been shown in highly simplified form and that in practice the processing circuitry 4 may include many further circuit elements. Furthermore, the example embodiment of FIG. 1 illustrates the processing circuitry 4 and the memory 6 as separate, but it will be appreciated that these elements may be formed in a combined manner on a system-on-chip integrated circuit or the like.

The processing circuitry 4 includes tracing circuitry 8 as part of an embedded trace macro cell (ETM) associated with the processing circuitry 4. The tracing circuitry 8 is responsive to signals 28 received from the pipeline 26 to generate an instruction trace stream including instruction elements representing instructions that are being executed. The trace circuitry 8 also receives signals 30 indicative of data transfers taking place between the processing circuitry 4 and the memory 6. These signals 30 are used by the trace circuitry 8 to control generation of a data trace stream including data elements representing data transfers which have been detected and are being traced. The embedded trace macrocell includes a trace buffer 32 into which the instruction trace stream and the data trace stream are stored prior to being transmitted to the apparatus for receiving trace data 14. The trace circuitry 8 is also responsive to a cancel signal from the pipeline 26 indicating that one or more instructions have been cancelled. The occurrence of an instruction cancel is one trigger for the insertion of synchronisation markers into the data trace stream 12 and the instruction trace stream 10 as will be discussed further below.

The apparatus for receiving trace data 14 in this example embodiment comprises a general purpose computer including receiving circuitry 34 for receiving the data trace stream 12 and the instruction trace stream 10 as well as a general purpose processor 36 and a program memory 38. A computer program stored within the program memory 38 and executed by the general purpose processor 36 analyses the received data trace stream 12 and instruction trace stream 10 to provide an indication to a user of which instructions have been executed and which data values have been transferred. This is useful for a variety of reasons such as debugging, diagnosis and performance optimisation. The analysis uses synchronisation markers within the instruction trace stream 10 and the data trace stream 12 to identify matching (correlated) positions within these trace streams 10, 12 so that data elements can be matched to instruction elements.

The operation tracing circuitry 8, and in particular the operation of an index storage unit (also known as the "tracking table") 220 within the ETM, is now described with reference to Table 1 below. Table 1 shows how the counter value, the oldest uncommitted value, and the tracking table are updated in the ETM, in the situation where the processor core speculatively executes groups of instructions A, B and C and subsequently indicates that group B should be cancelled and group A should be committed.

Group A starts with a load (LDR) instruction which is "interesting" and currently being traced. Hence, the entry of first index unit 230 corresponding to group A ("A.first") stores the current counter value of 0 and then the counter is incremented to 1. Finally the entry of last index unit 240 corresponding to group A ("A.last") stores the current counter value of 1. The next instruction in group A is the move instruction (MOV) which is neither "interesting" nor traced. The last instruction of group A is the branch-if-equal (BEQ) instruction which is both "interesting" and traced, so the counter is incremented to 2. The entry of last index unit 240 corresponding to group A ("A.last") is then updated with the current counter value of 2. It should be noted in fact that the final step for each instruction is always for the entry of last index unit 240 corresponding to the current group to be updated with the current counter value. Of course only if the counter has been updated for that instruction does this have any effect. The updating of the "last" value in this way is not explicitly described for the remaining instructions shown in Table 1.

Group B begins with the ADD instruction which is neither "interesting" nor traced, but as the first instruction in a new group causes the current counter value 2 to be stored in the corresponding entry of the first index value storage unit (i.e. B.first=2). The second instruction in group B is the SUB instruction which is similarly neither "interesting" nor traced and does not update any values.

Group C begins with the store (STR) instruction which is both "interesting" and traced, hence the current counter value is stored in the C.first entry of the first index storage unit and the counter is then incremented to 3. The second instruction in group C is the branch-if-not-equal (BNE) instruction which is also "interesting" and traced, so the counter is updated to 4.

Next, the processor core indicates that the speculative execution of group B was incorrect and therefore groups B and C should be cancelled. In response, the ETM (controlled the system requirements, i.e. whether less hardware in the trace unit or less bandwidth in the trace stream is deemed more important.

TABLE 1

Index storage unit values during speculative execution

| Group | Execute | Trace | Count value before | Oldest uncommitted count | Tracking table updates | Notes |
|---|---|---|---|---|---|---|
| A | LDR | LDR | 0 | 0 | A.first = 0<br>A.last = 1 | Count → 1 |
| A | MOV |  | 1 | 0 | A.last = 1 |  |
| A | BEQ | BEQ | 1 | 0 | A.last = 2 | Count → 2 |
| B | ADD |  | 2 | 0 | B.first = 2<br>B.last = 2 |  |
| B | SUB |  | 2 | 0 | B.last = 2 |  |
| C | STR | STR | 2 | 0 | C.first = 2<br>C.last = 3 | Count → 3 |
| C | BNE | BNE | 3 | 0 | C.last = 4 | Count → 4 |
|  | Cancel Group B | Cancel 2 items | 4 | 0 |  | Current count = 4, B.first = 2, therefore cancel 2 items (4-2); Count → 2 |
|  | Commit Group A | Commit 2 items | 2 | 0 |  | Oldest uncommitted = 0, A.last = 2, therefore commit 2 items (2-0); Oldest uncommitted → 2 | by tracing circuitry 8) references the current count value of counter 210, which is currently 4, and the value stored in the corresponding entry of the first index storage unit 230 (i.e. B.first) which is 2. The ETM thus determines that two items of trace data should be cancelled (4-2) and generates an item of trace data indicative of this fact. The counter 210 is then reset to 2 (since it was previously 4 and 2 items have been cancelled).

Next, the processor core indicates that instruction group A should be committed, since it has determined that the speculative execution of this group of instructions was correct. In response the ETM (under control of the tracing circuitry 8) references the value stored in the oldest uncommitted storage unit 250 (currently 0) and the entry in the last index storage unit 240 corresponding to this group (i.e. A.last) which is 2. The ETM thus determines that two items of trace data (2-0) should be committed, and generates an item of trace data indicative of this fact. The value stored in the oldest uncommitted storage unit 250 is then reset to the "last" value read for this group, i.e. 2 in this example.

Figure 2:
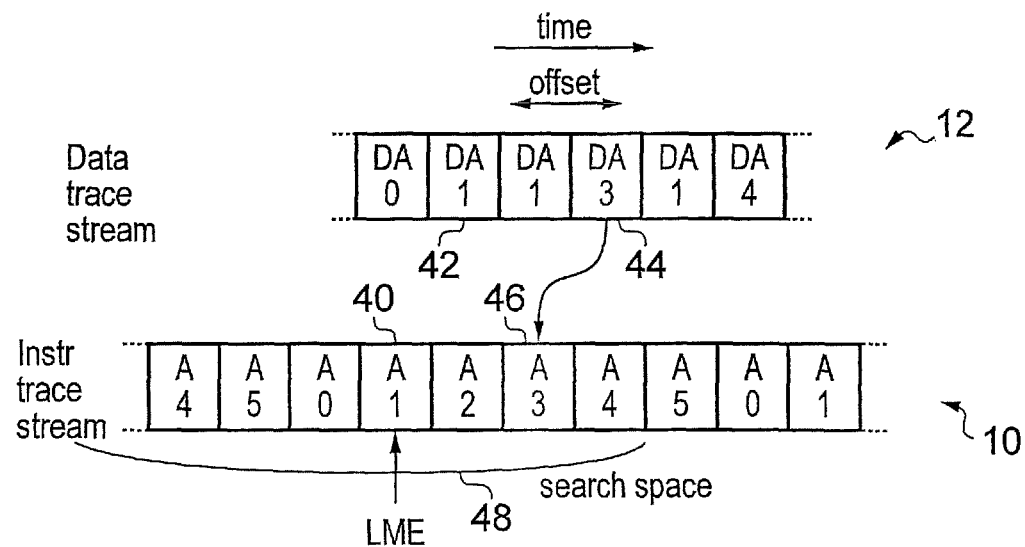
FIG. 2 schematically illustrates an instruction trace stream and a data trace stream with the relationship between data elements and instruction elements being indicated by matching key values.

In the embodiment described with reference to Table 1, it will be noted that the cancelling and committed is performed by reference to a number of events wherein the generated item of trace data indicates the number of events that should be cancelled or committed. In an alternative embodiment the trace unit can generate the cancelling/committing item of trace with reference to an event number. When this is the case, for a cancelling item of trace, the event number will be taken from the "first" value, i.e. the corresponding entry of the first index value storage unit, and for a committing item of trace the event number is taken from the "last" value, i.e. corresponding entry in the last index value storage unit. Note that although it might appear that committing and cancelling by event number would require less hardware (since the subtraction is not required), it should be noted that when indicating the cancelling/committing by a number of events this can often be compressed because it will generally have leading zeros. The choice of whether to commit/cancel by "number of event" or "event number" can be determined depending on FIG. 2 schematically illustrates multiple trace streams 10, 12. In this example embodiment these multiple trace streams are a data trace stream 12 and an instruction trace stream 10. It will be appreciated that more general aspects the present technique of inserting synchronisation markers within different trace streams need not be limited to situations in which those trace streams comprise a data trace stream 12 and an instruction trace stream 10.

In the example of FIG. 2 the instruction trace stream 10 includes a sequence of instruction elements ("atoms") each being marked with a key value within the range 0 to 5. The key values are applied to the instruction elements in an incrementing sequence. The sequence wraps after the key value of 5 back to the key value of 0. It will be appreciated that this range of key values is only one example and in practice a much larger range and/or any predefined sequence may be used. Furthermore, the increment in this example is an ascending increment but it is also possible that the increment may be applied so as to result in falling absolute values of the key value which then wrap when the key value reaches zero. Furthermore, the key values could change by a value different to one if this was appropriate in the context of the overall system. All these possibilities are encompassed by the present techniques.

Within the instruction trace stream 10 there is a last matched instruction element (LME) 40 which corresponds to the latest instruction element which has been matched, i.e. of all the instruction elements that have previously been matched the LME is the youngest. In the example illustrated in FIG. 2, a data element 44 is to be inserted within the data trace stream 12 following detection of a data transfer between the processing circuitry 4 and the memory 6. This data element 44 is to be matched with an instruction element 46 within the instruction trace stream 10. The tracing circuitry 8 determines that this is the correct match by analysing the signals 28 from the pipeline 26 and the signals 30 derived by snooping the data path (e.g. memory addresses may be used by the trace circuitry 8 to match data transfers to instructions). In order that the data element 44 and the instruction element 46 can be matched together within the data trace stream 12 and the instruction trace stream 10, they are marked with matching key values, in this example a key value of 3.

The precise timing at which the data element 44 is inserted in the data trace stream 12 will vary in dependence upon the variable latency of the data transfer. Thus, there is a variable offset between the instruction element 46 and its corresponding data element 44. This variable offset also results in the data elements within the data trace stream 12 not necessarily following the same order as their corresponding instruction elements within the instruction trace stream 10. This out-of-order behaviour of the data elements within the data trace stream 12 is one reason why the use of key values is important in being able to properly analyse the data trace stream 12 and the instruction trace stream 10 in a correlated manner to understand the precise behaviour of the processing circuitry 4 and the memory 6.

Positioned around the last matched instruction element (LME) 40 within the instruction trace stream 10 is disposed a search space 48. This search space is used in defining and controlling when synchronisation markers should be inserted into the data trace stream 12 and the instruction trace stream 10 as will be discussed below. The search space 48 is positioned to have a fixed relationship with the last matched element 40 and accordingly as the last matched element 40 moves position within the instruction trace stream 10, then the search space 48 also moves within the instruction trace stream 10. In the example shown in FIG. 2 the search space 48 has a size such that it spans one complete numerical range of the key values, i.e. the search space encompasses the full range of possible key values extending from 0 to 5.

Figure 3:
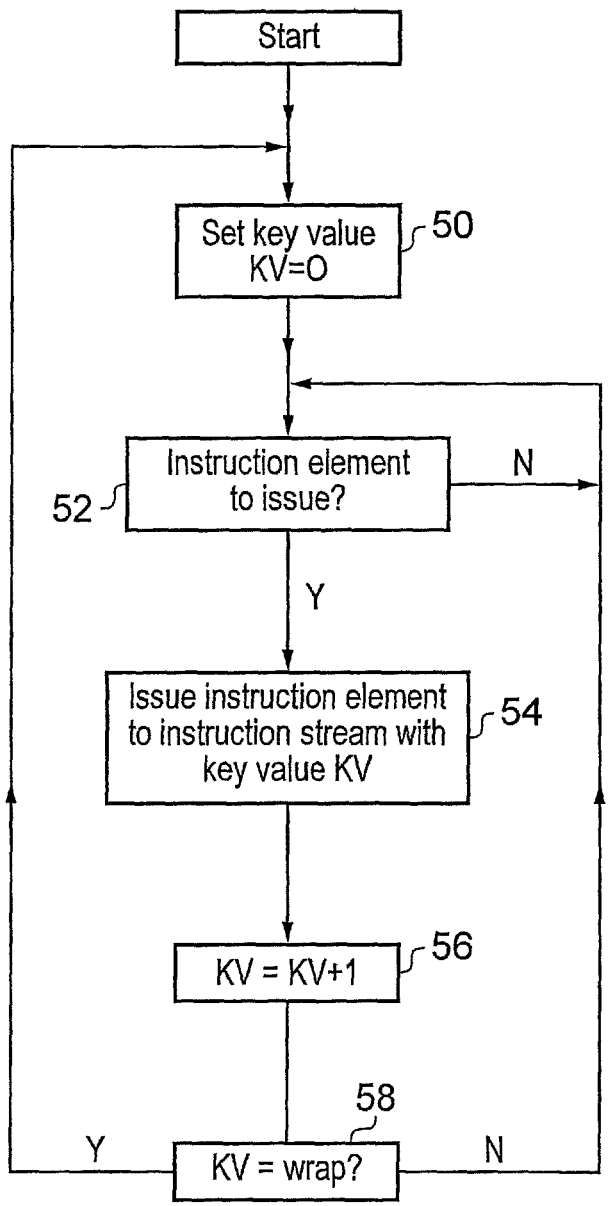
FIG. 3 is a flow diagram schematically illustrating a process for determining what key value is to be associated with an instruction element being inserted within the instruction trace stream.

FIG. 3 is a flow diagram schematically illustrating processing which may be performed by the trace circuitry 8 in determining which key value to associate with an instruction element to be issued into the instruction trace stream 10. At step 50 the key value KV is initialised to a value of zero. At step 52 the processing waits until an instruction element is to be issued into the instruction trace stream 10. When such an instruction element is to be issued, then processing proceeds to step 54 at which the current value of the key value KV is associated with the instruction element being placed into the instruction trace stream 10 (e.g. an empty field within the instruction element is used to hold the current value of the key value KV).

At step 56 the key value KV is incremented. At step 58 a determination is made as to whether or not the key value has now reached the state in which it should be subject to a wrap operation. In the example illustrated, if the key value reaches "6", then a wrap should be performed and processing is returned to step 50 where the key value is again initialised to "0". If a wrap is not required in the key value, then processing returns to step 52 where another instruction element to be issued is awaited.

Figure 4:
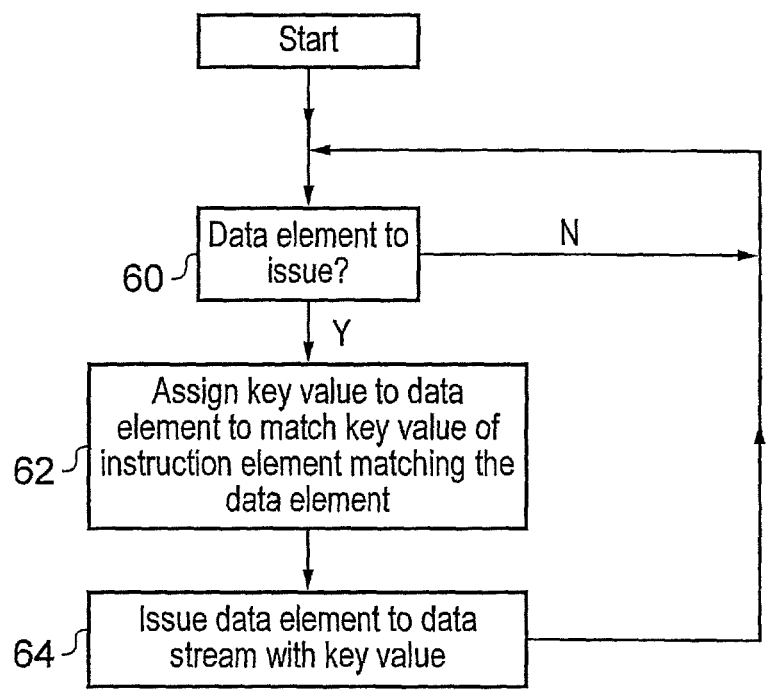
FIG. 4 is a flow diagram schematically illustrating how a key value is assigned to a data element to be inserted within the data trace stream.

FIG. 4 is a flow diagram schematically illustrating processing performed by the trace circuitry 8 in associating a key value KV with a data element to be inserted in the data trace stream 12. At step 60 the processing waits until a data element is detected that is to be issued into the data trace stream 12. When such a data element is detected, then step 62 assigns a key value KV to that data element to match the key value KV of the instruction element which has already been issued into the instruction trace stream 10 and which corresponds to the data element concerned.

Thus, a load instruction may be executed and an instruction element corresponding to that instruction inserted into the instruction trace stream 10. When the data value is returned in response to that load instruction (which can be a variable number of processing cycles later), then the corresponding data element is inserted within the data trace stream 12 and is marked with the matching key value to that of the instruction element of the load instruction. The trace circuitry 8 tracks such "in-flight" instructions which give rise to data transfers to be marked with data elements and accordingly when the data elements arrives the trace circuitry 8 associates the matching key value with that data element.

Following step 62, step 64 serves to issue the data element now marked with the appropriate key value into the data trace stream 12 and processing is returned to step 60.

Figure 5:
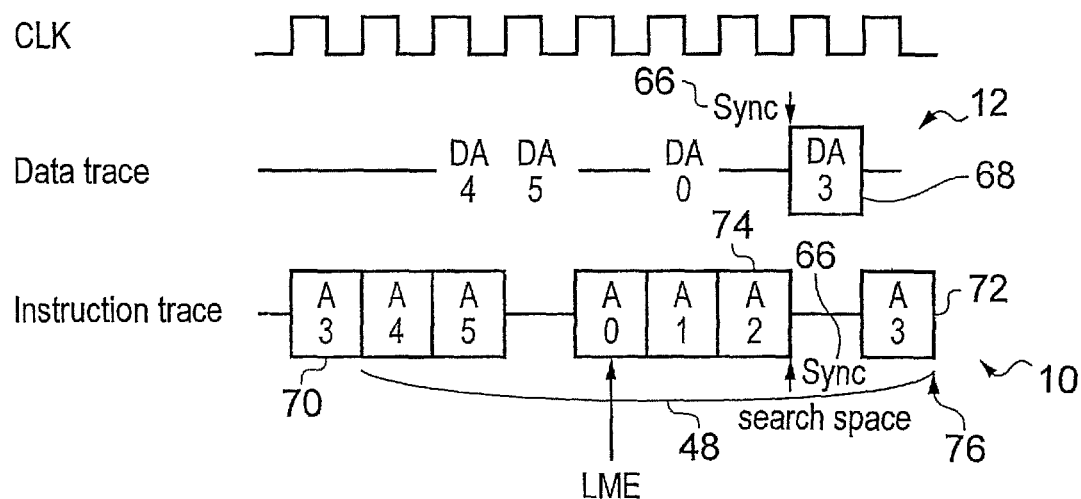
FIG. 5 schematically illustrates the situation in which a data element is inserted within the data trace stream too late to be readily matched with its corresponding instruction element such that insertion of synchronisation markers is triggered.

FIG. 5 schematically illustrates one example of a circumstances in which insertion of synchronisation markers 66 into both the data trace stream 12 and the instruction trace stream 10 is triggered. The example of FIG. 5 is a situation in which the data element 68 is to be inserted too late after the corresponding instruction element 70 was issued into the instruction trace stream 10. It will be seen that in the example shown in FIG. 5 the data element 68 has arisen before instruction element 72 has been inserted within the instruction trace stream 10 and since a data transfer cannot arise prior to its corresponding instruction being executed, it is the case that the data element 68 corresponds to the much earlier instruction element 70.

The trace circuitry 8 operates by tracking the most recently generated instruction element within the instruction trace stream 10. Furthermore, the latest end of the search space 48 is determined based upon a fixed calculation derived from the position of the latest matched element LME, which is also tracked. If the key of the data element 68 being inserted is later than the key of the most recently generated instruction element 74, but is earlier than or equal to the latest end 76 of the search space 48, then the data element 68 corresponds to an instruction element 70 earlier than the search space and accordingly synchronisation markers 66 (such as a unique bit pattern) are inserted in both the data trace stream 12 and the instruction trace stream 10.

Figure 6A:
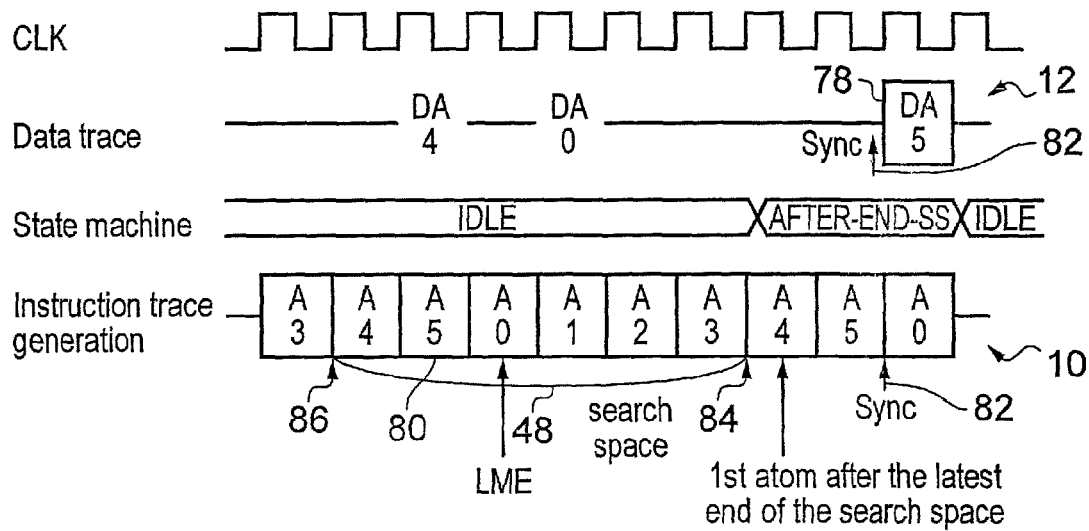
FIG. 6A schematically illustrates the situation in which there is too large a gap between a data element within the data trace stream and the corresponding instruction element within the instruction trace stream such that insertion of synchronisation markers is triggered.

FIG. 6A schematically illustrates the situation in which there is too long a gap between insertion of a data element 78 and the preceding data element. The requirement to insert synchronisation markers 82 in this circumstance is identified by the data element 78 having a key value corresponding to a position after the latest end 84 of the search space 48 when the key value of the data element 78 matches the key value of a data element 80 lying between the last matched element LME and the earliest end 86 of the search space 48.

Figure 6B:
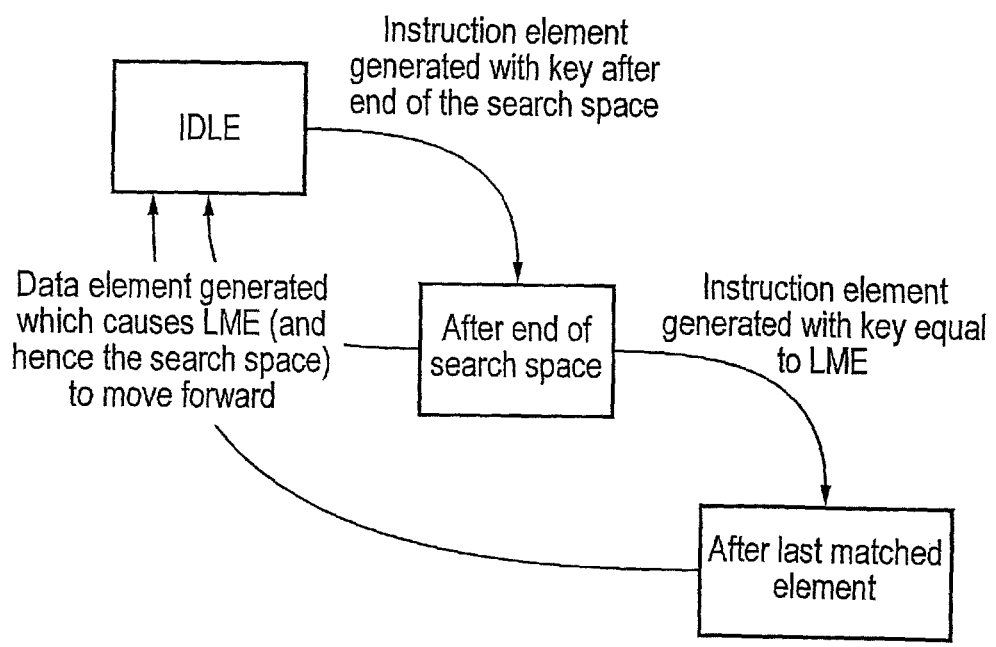
FIG. 6B is a state diagram schematically illustrating the relationship between states of the systems and when synchronisation markers are inserted.

The generation of the synchronisation markers 82 in accordance with the situation in FIG. 6A may be controlled using a state machine with three states. This state machine can have an idle state, an after end of search space state and an after last matched element state as illustrated in FIG. 6B. The state machine will occupy the idle state until an instruction element is generated that is past the end of the search space. This will move the state machine to the after end of search space state. In this state, the state machine may return to the idle state if the search space advances such that the instruction element is no longer after the latest end of the search space. From the after end of search space state, the state machine may advance to an after last match element state if the key of the instruction generated is equal to the LME key. A synchronisation marker is inserted when:

we are in "after end of search space" state and the data element key lies between the oldest end of the search space and the LME, or we are in "after last match element" state and any data element is generated.

Figure 7:
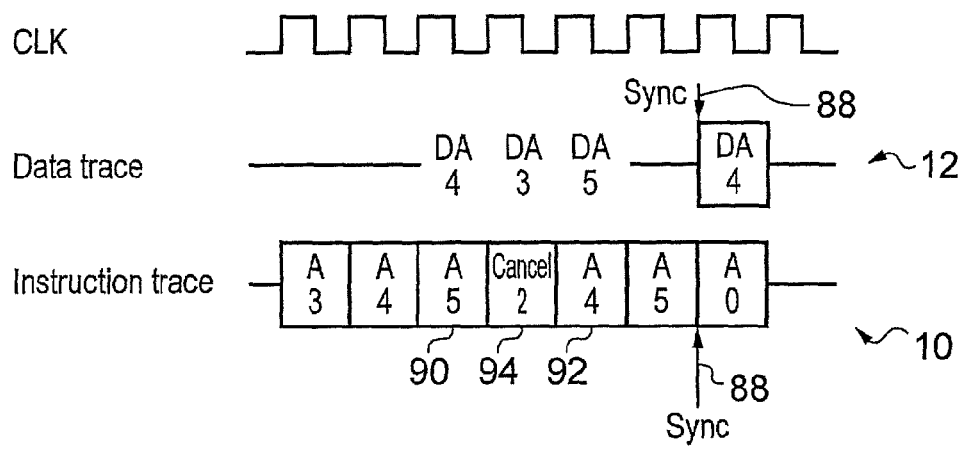
FIG. 7 schematically illustrates the situation in which an instruction is cancelled and key values of instruction elements reused such that insertion of synchronisation markers should be triggered.

FIG. 7 illustrates the situation in which synchronisation markers 88 are inserted in the data trace stream 12 and the instruction trace stream 10 when two instructions are cancelled including an instruction corresponding an instruction element 90. The sync markers are inserted for at least the first data element corresponding to an instruction after the instruction which is cancelled. To control this insertion, the trace circuitry 8 stores an indication of the oldest cancelled instruction element. This key serves as the key for the first instruction element after the cancel. In the example illustrated, the cancel operation serves to cancel the instruction elements marked with the keys "4" and "5". Accordingly, the key "4" is reused following the cancel operation and marks the first instruction element 92 following the cancel marker 94 within the instruction trace stream 10. Returning to the data element 88, if the key of this data element 88 lies between the oldest cancelled instruction element and the most recently generated instruction element (including the end point instruction elements), then it may be the first data element after a cancel and so synchronisation markers are inserted in both the instruction trace stream 10 and the data trace stream 12. If a second cancel occurs before this is detected, then the cancel value of the oldest cancelled instruction element is updated. In this case, the trace circuitry 8 inserts synchronisation markers for all the data elements until the first data element corresponding to an instruction element after the most recently cancelled instruction element is detected. When the first data element corresponding to an instruction element after the cancelled instruction is detected, then cancel key is marked as invalid and further synchronisation marks subsequent to the cancel need not be inserted. If an instruction element is generated with a key equal to the cancel value, then the keys have wrapped. In this case a synchronisation marker is inserted for the next data element. This is unlikely to happen unless there is a long period after a cancel with no data elements.

Figure 8:
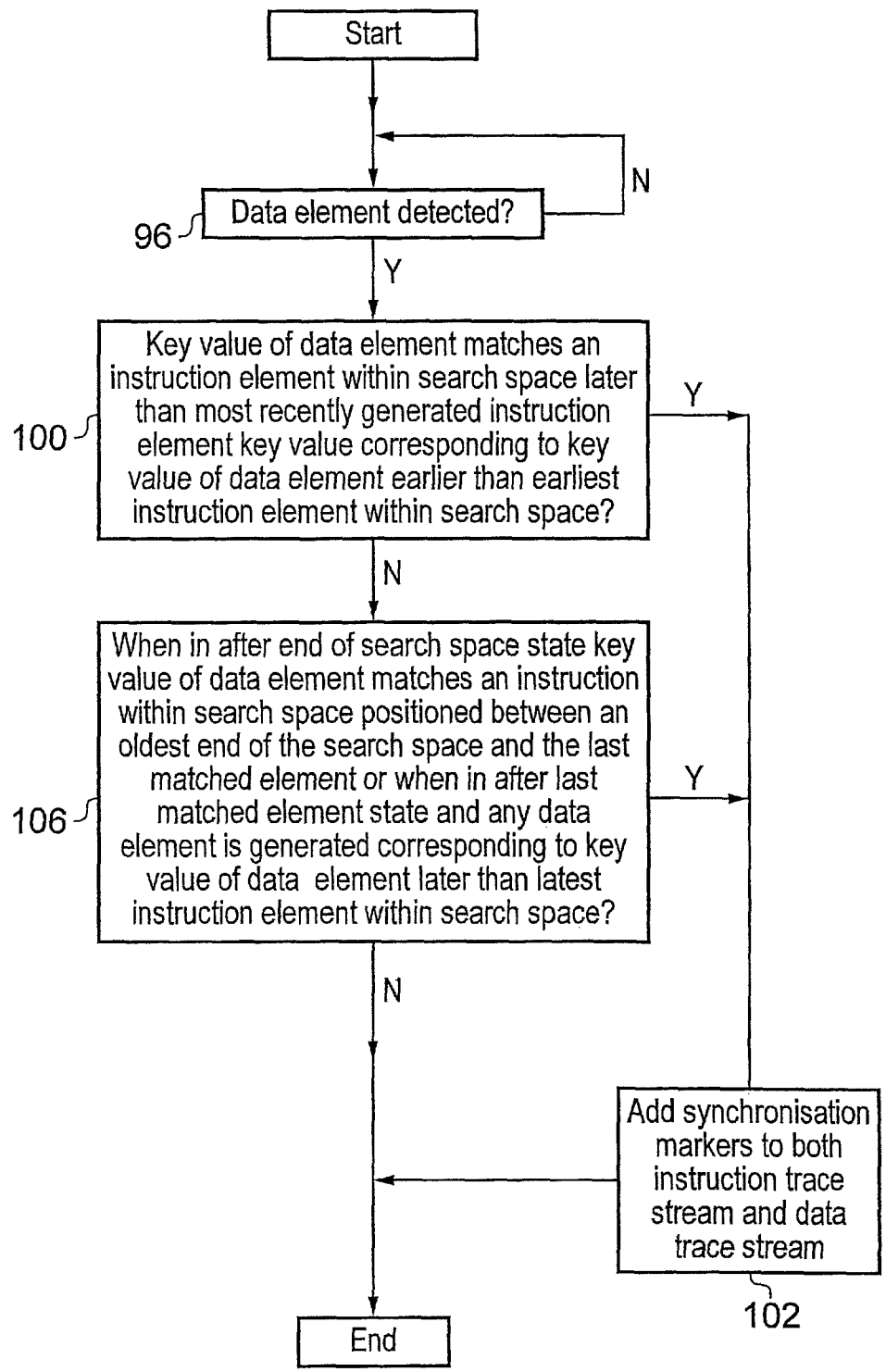
FIG. 8 is a flow diagram schematically illustrating control to insert synchronisation markers when a data element arises too late relative to the corresponding instruction element or where there is too large a gap between a data element and the corresponding instruction element.

FIG. 8 is a flow diagram illustrating operation of the trace circuitry 8 in inserting synchronisation markers in accordance with the situations illustrated in FIGS. 5 and 6. At step 96 processing waits until a data element is detected. Step 100 determines whether the key value of the data element matches an instruction element within the search space 48 later than the most recently generated instruction element key value. This corresponds to the key value of the data element being earlier than the earliest instruction element within the search space. If this test is met, then processing proceeds to step 102 where synchronisation markers are inserted into both instruction trace stream 10 and the data trace stream 12.

If the determination at step 100 was that the test being made was not satisfied, then processing proceeds to step 106. Step 106 where a determination is made, when in after end of search space state, as to whether the key value of the data element matches an instruction element within the search space 48 positioned between an oldest end of the search space and the last matched element or when in after last matched element state and any data element is generated. This corresponds to the key value of the data element being later than the latest instruction element within the search space. If the determination at step 106 is that the match is made, then processing proceeds to step 102 where synchronisation markers are inserted. If both the determinations at step 100 and step 106 are not met, then no synchronisation markers are inserted.

Figure 9:
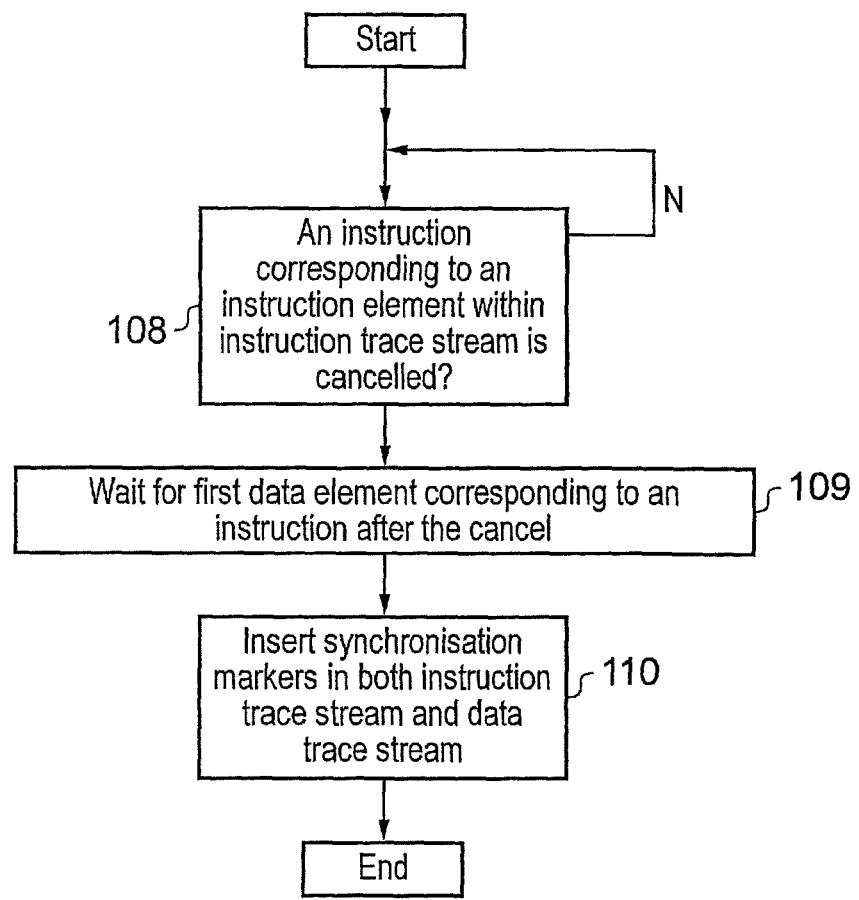
FIG. 9 is a flow diagram schematically illustrating the control performed when triggering insertion of synchronisation markers upon a occurrence of an instruction cancel.

FIG. 9 is a flow diagram schematically illustrating operation of the trace circuitry in accordance with the situation illustrated in FIG. 7. At step 108 the processing waits until an instruction corresponding to an instruction element within the trace stream is cancelled. At step 109 processing waits for the first data element corresponding to an instruction after the cancel. Step 110 notes the key value of the oldest instruction to be cancelled and then when a data element arises with a key value between the latest cancelled instruction and the most recently generated instruction element, then synchronisation markers are inserted in both the instruction trace stream 10 and the data trace stream 12.

The operation of a trace analysis tool in accordance with the present techniques will be discussed with reference to FIGS. 10A to 10D.

The tool will receive instruction and data trace elements in separate streams so it must do some work to match the data with the instructions. It should consider each data trace element in turn in the order that it is received. For each one it must try and find a corresponding match among the instruction trace elements (or atoms). To do this it takes one of the two actions:

If the data trace element currently being considered was preceded by a sync mark, then the corresponding sync mark must be found among the instruction trace elements. This is done by matching up sync marks as they are received, which is a simple task because there are the same number of sync marks in both streams and they are in the same order in both streams. Once the corresponding sync mark is found, the tool should search backwards from that sync mark until it finds an instruction element with the correct trace key.

Otherwise the tool should search according to the search space concept. Because cancels may be present in the instruction trace this is a little more complex than just searching the search space. Instead the following steps are followed, in this order, until a matching instruction element is found:
1) Search forwards from (and including) the LME until either:
   a. a cancel trace element is found
   b. the most recent end of the search space is found
2) Search from the LME backwards until a match is found or the tool runs out of instructions, even if this means going further back than the oldest end of the search space.

Matching cannot start until a pair of sync markers (one from each stream) is found, then the first rule above can be applied and the LME set. The LME is updated when the matching atom is later than the current LME, whichever action is used.

Figure 10A:
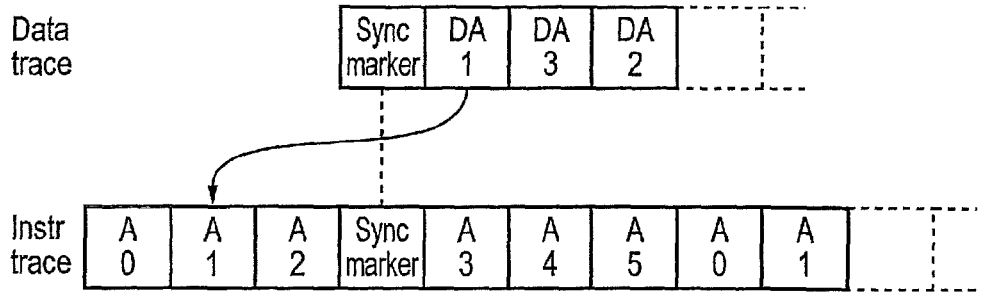
FIGS. 10A to 10D schematically illustrate recovery of diagnostic information from streams of trace data.
Figure 10B:
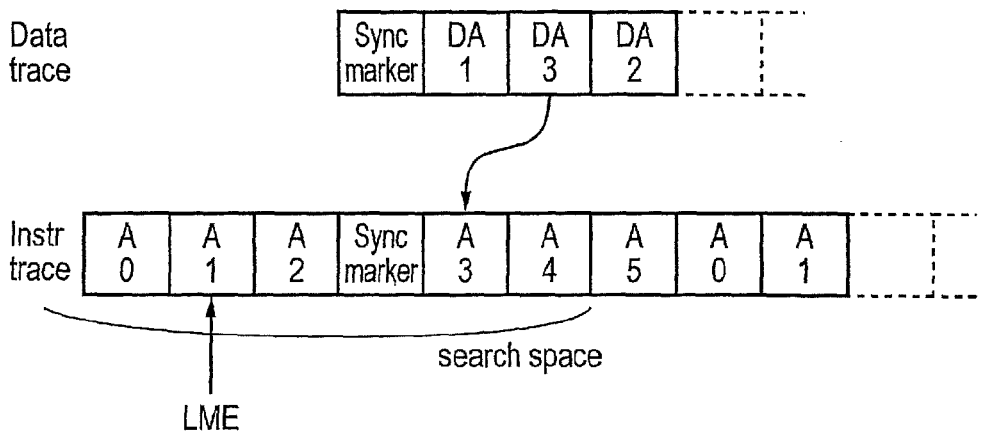
Figure 10C:
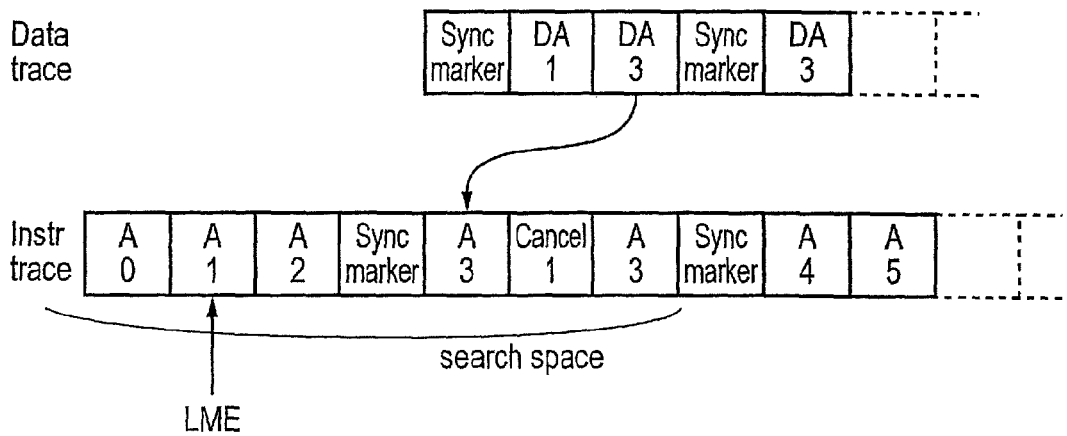

FIG. 10A shows an example where the tool has found a data address element "DA 1" after a sync mark and matches it with the corresponding atom. After this match the LME will become the "A 1" indicated:

FIG. 10B shows an example where the tool is considering "DA 3" and is matching using the search space. There are no cancels. After this match the LME will move forward to "A 3":

FIG. 10C shows an example where the tool is matching when there is a cancel. It is considering "DA 3". It searches forwards from the LME and finds a matching instruction before the cancel. After this match the LME will move forward to "A 3".

Figure 10D:
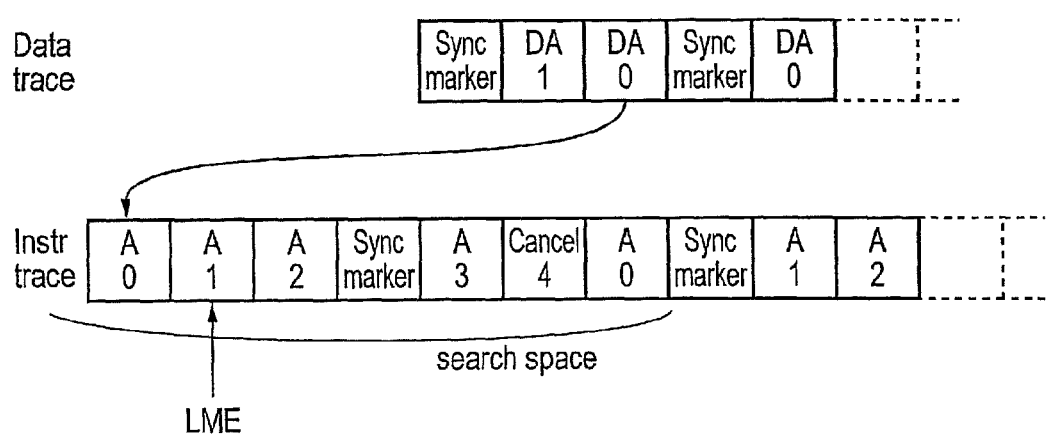

FIG. 10D shows an example where the tool is matching when there is a cancel. It searches forwards from the LME but does not find a match before the cancel, so it then searches backwards and finds a match. After this match the LME does not move because the matching atom is earlier than the LME.

Embodiments of the present invention may comprise one or more data streams. For example, embodiments of the present invention may comprise a plurality of data streams. As data paths in CPUs widen and as the number of transfers that can occur concurrently increase, the cost of a single data trace stream increases in a non-linear manner. Consequently, it may be appropriate to provide a number of different data trace streams that are correlated with a single instruction trace stream. For example, one data stream may be used for loading data and a second data stream may be used for storing data.

Figure 11:
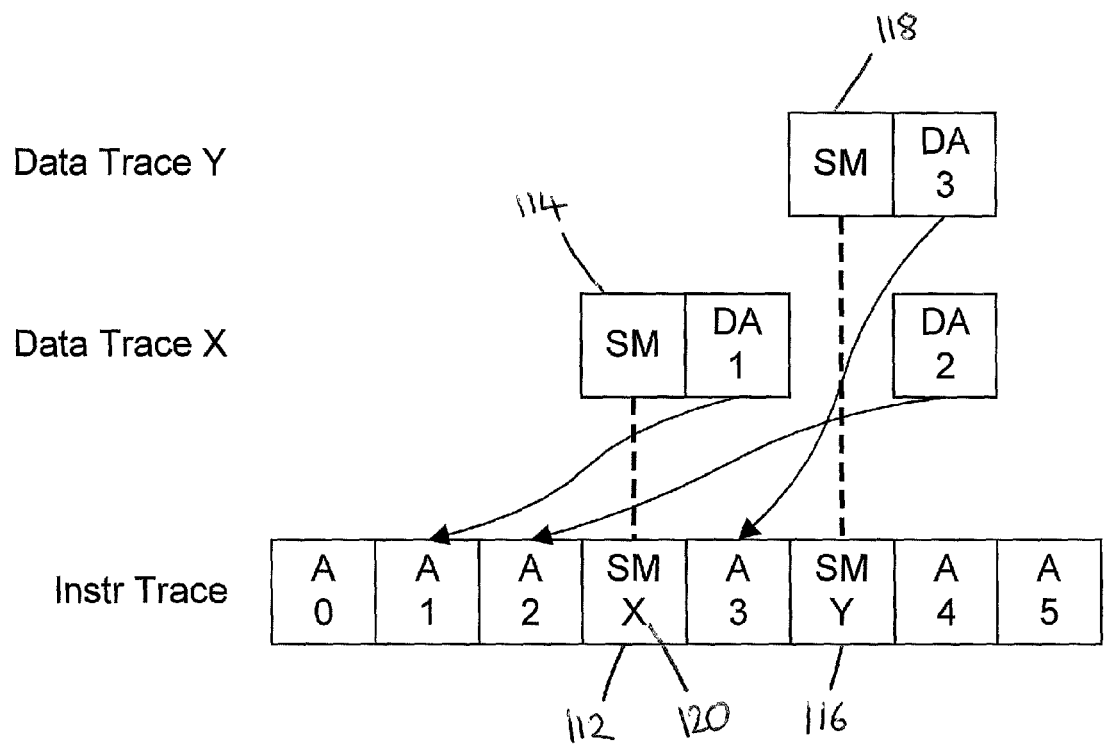
FIG. 11 schematically illustrates the correlation of a single instruction trace stream to multiple data trace streams.

FIG. 11 shows one such example. In FIG. 11 a pair of data trace streams X and Y are provided, together with a single instruction trace stream. As before, each instruction element in the instruction trace stream comprises a key value. The key value in the instruction trace stream corresponds to a data element in one of the data trace streams. The instruction trace stream also may also comprise one or more synchronisation markers 112, 116. These may be added to the instruction trace stream and data trace stream in one of the ways previously discussed. In particular, the aforementioned processes for determining when a synchronisation marker should be inserted may be executed for each of the multiple data trace streams. Each time the process is executed it may consider a different one of the multiple data trace streams in turn.

Each synchronisation marker in the instruction trace stream corresponds with a known point (e.g. another synchronisation marker) in one of the data trace streams. For example, synchronisation marker 112 of the instruction trace stream corresponds with synchronisation marker 114 of data trace stream X and synchronisation marker 116 corresponds with synchronisation marker 118 of data trace stream Y. Since there is a plurality of data trace streams, it is necessary for each synchronisation marker in the instruction trace stream to identify which data trace stream that synchronisation marker corresponds with. In the present example, this is achieved by each synchronisation marker of the instruction trace stream comprising a reference 120 to one of the multiple data trace streams. The reference may be used to uniquely associate a synchronisation marker with a particular data stream. In this way, synchronisation markers can be used to synchronise an instruction trace stream with a plurality of data trace streams.

Figure 12:
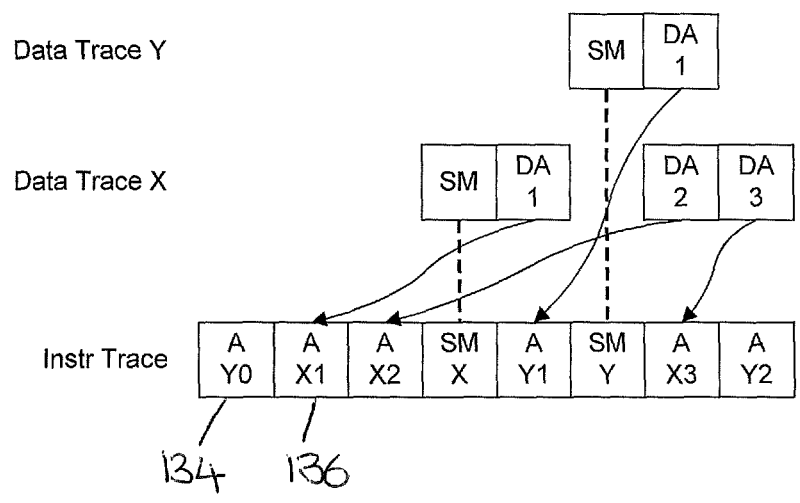
FIG. 12 schematically illustrates the use of multiple sets of key values, with each set of key values being used for a different data trace stream.

In the previous examples, it has been discussed how key values may be used to identify particular data trace elements or instruction trace elements. It has previously been assumed that a single set of key values is shared between each of the data trace streams. That is, all of the key values lie within a single namespace. FIG. 12 shows an example in which multiple sets of key values are used, with each set of key values being used for a different data trace stream. That is, the key values for each data trace stream use their own independent namespace. In order to differentiate between the namespaces, each key value in each element of the instruction trace stream (in this example) comprises an indication of which namespace is being used. That is, the key value in each element of the instruction trace stream comprises an indication of which data trace stream is being referred to. For example, data element 134 in the instruction trace stream contains a reference to key value 0 in namespace Y (which corresponds to the namespace used by data trace stream Y). Furthermore, data element 136 in the instruction trace stream contains a reference to key value 1 in namespace X (corresponding to the namespace used by data trace stream X). Consequently, the keys used for a particular data trace stream may be more sequential and therefore more compressible.

Embodiments of the present invention may comprise one or more instruction streams. For example, embodiments of the present invention may comprise a plurality of instruction streams. Such a situation may arise in multi-threading processors. In such systems, there may be a plurality of instruction streams (i.e. one for each thread) and only a single data stream. Multiple namespaces (i.e. multiple separate sets of key values) may be used for each instruction trace stream. Consequently, it can be indicated which instruction trace stream is being referred to by a data element.

Figure 13:
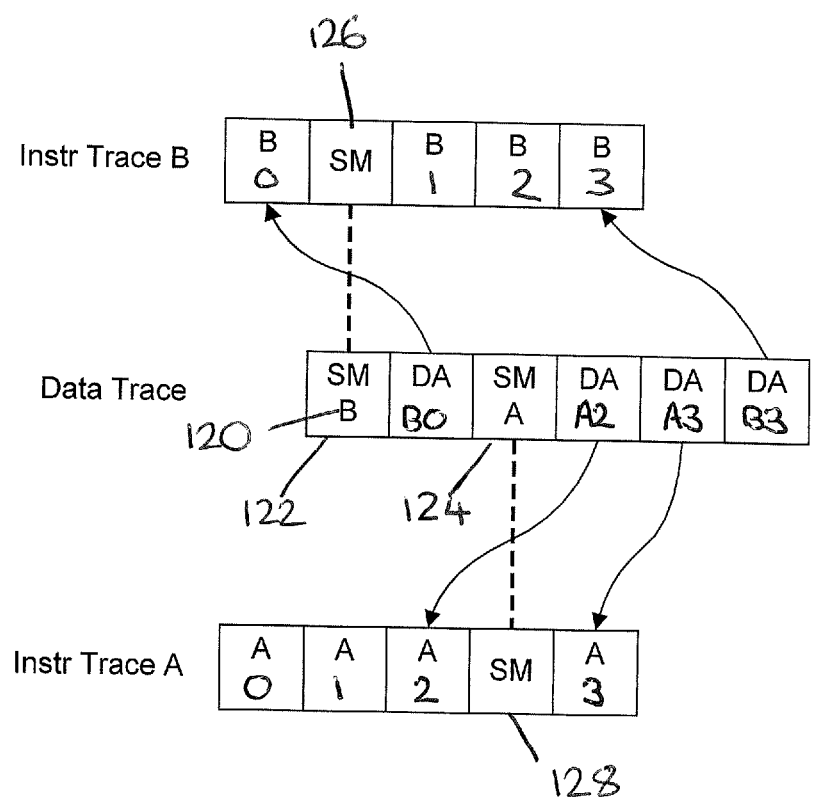
FIG. 13 schematically illustrates the correlation of multiple instruction trace streams to a single data trace stream.

FIG. 13 shows an example of multiple instruction trace streams in combination with a single data trace stream. Each data element in the data trace stream comprises a key value. The key values in each data element of the data trace stream correspond to an instruction element in one of the instruction trace streams. The data trace stream may also comprise one or more synchronisation markers 122, 124. In the example of FIG. 13, each synchronisation marker corresponds with a synchronisation marker in one of the instruction streams. Since there are multiple instruction streams, each synchronisation marker in the data trace stream comprises a reference 120, which indicates the instruction stream that the synchronisation marker relates to. For example, synchronisation marker 122 comprises a reference indicating that it relates to instruction trace stream B and synchronisation marker 122 corresponds with synchronisation marker 126 in instruction stream B. Synchronisation marker 124 comprises a reference that indicates that the synchronisation marker relates to instruction trace stream A and synchronisation marker 124 corresponds with synchronisation marker 128 in instruction stream A. Note that in this example, each of the data elements uses a different namespace for the two instruction trace streams.

The synchronisation markers may be added to the data trace stream and instruction trace streams in one of the ways previously discussed. In particular, the aforementioned processes for determining when a synchronisation marker should be inserted may be executed for each of the multiple instruction trace streams. Each time the process is executed it may consider a different one of the multiple instruction trace streams in turn.

Figure 14:
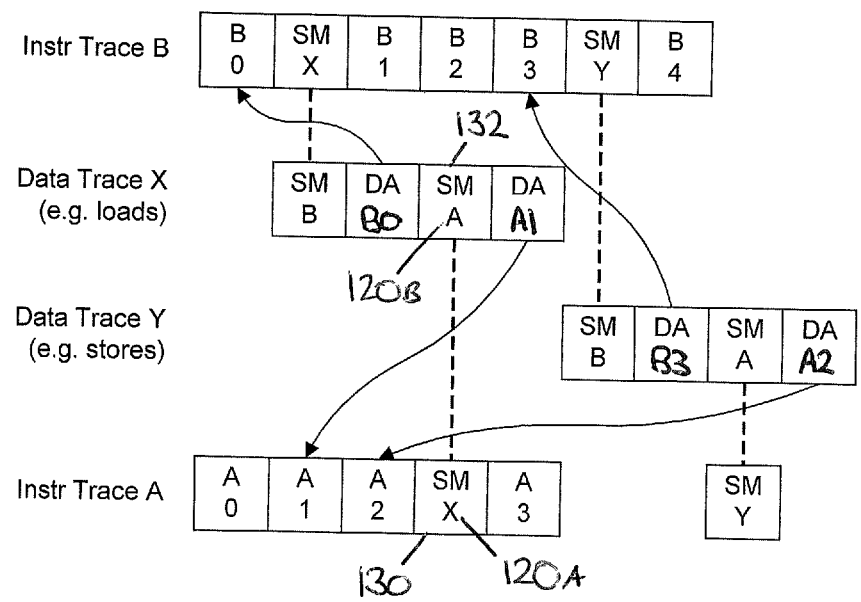
FIG. 14 schematically illustrates the correlation of multiple instruction trace streams to multiple data trace streams.

In FIG. 14, an example of using multiple instruction trace streams and multiple data trace streams is shown. This may occur, for example, if multiple data streams (e.g. one data stream for loads and one for stores) are shared between the instruction streams of a multi-threading processor. Synchronisation markers in both the data trace streams and instruction trace streams comprise a reference 120A/B. The reference 120A in a synchronisation marker in an instruction trace stream corresponds with one of the multiple data trace streams and the reference 120B in a synchronisation marker in a data trace stream corresponds to one of the instruction trace streams. For example, synchronisation marker 130 in instruction trace stream A corresponds with synchronisation marker 132 in data trace stream X and vice-versa. Again, multiple namespaces are used in this example to indicate which instruction trace stream is being referred to by a data element in the data trace stream.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
    processing circuitry configured to perform processing operations in response to a stream of program instructions; and
    tracing circuitry coupled to said processing circuitry and configured to generate trace data indicative of said processing operations performed by said processing circuitry;

wherein said trace data comprises a plurality of separate trace streams including at least one first trace stream and at least one second trace stream and said trace circuitry is configured to insert a synchronisation marker in one of said at least one second trace stream to mark a synchronisation point which matches a known point in one of said at least one first trace stream;

wherein, in addition to insertion of said synchronisation marker, said trace circuitry is configured to mark individual elements within said plurality of separate trace streams with respective key values.

2. Apparatus as claimed in claim 1, wherein said plurality of trace streams comprises a plurality of first trace streams.

3. Apparatus as claimed in claim 1, wherein said plurality of trace streams comprises a plurality of second trace streams.

4. Apparatus as claimed in claim 1, wherein said plurality of trace streams comprises a plurality of first trace streams and a plurality of second trace streams.

5. Apparatus as claimed in claim 1, wherein said known point in said at least one first trace stream is also a synchronisation marker.

6. Apparatus as claimed in claim 5, wherein said synchronisation marker in said at least one first trace stream comprises a reference to one of said at least one second trace stream.

7. Apparatus as claimed in claim 1, wherein said at least one first trace stream is at least one instruction trace stream indicative of program instructions processed by said processing circuitry and said at least one second trace stream is at least one data trace stream indicative of data transfers between said processing circuitry and a memory.

8. Apparatus as claimed in claim 7, wherein said at least one instruction trace stream comprises a sequence of instruction elements and said at least one data trace stream comprises a sequence of data elements.

9. Apparatus as claimed in claim 1, wherein said at least one first trace stream comprises a sequence of instruction elements and each of said at least one second trace stream comprises a sequence of data elements and said trace circuitry is configured to mark individual data elements within said sequence of data elements with respective key values matching key values of instruction elements within said at least one instruction trace stream corresponding to respective program instructions associated with said data elements.

10. Apparatus as claimed in claim 9, wherein said key values comprise a plurality of sets of key values, wherein each set of key values in said plurality of sets of key values is used to mark individual data elements within said sequence of data elements in a different data trace stream.

11. Apparatus as claimed in claim 9, wherein said key values are used to mark individual data elements within said sequence of data elements in each of the at least one data trace stream.

12. Apparatus as claimed in claim 9, wherein data elements and instruction elements having matching key values have a variable offset between their respective positions within said at least one data trace stream and said at least one instruction trace stream.

13. Apparatus as claimed in claim 9, wherein said trace circuitry is configured to incrementally change said key values of said instruction elements between adjacent instruction elements within said at least one instruction trace stream.

14. Apparatus as claimed in claim 9, wherein said key values of said instruction elements have a predetermined order within said at least one instruction trace stream.

15. Apparatus as claimed in claim 14, wherein said key values of said data elements have a variable order within said at least one data trace stream.

16. Apparatus as claimed in claim 13, wherein said trace circuitry is configured to wrap said key values within a predetermined range of key values.

17. Apparatus as claimed in claim 9, wherein said trace circuitry is configured to match data elements to instruction elements by detecting matching key values therebetween within a search space of adjacent instruction elements of said at least one instruction trace stream.

18. Apparatus as claimed in claim 17, wherein said search space is located within said at least one instruction trace stream to have a fixed position relative to a last matched instruction element within said at least one instruction trace stream, said last matched instruction element corresponding to a latest appearing instruction element within said at least one instruction trace stream for which a matching data element has been placed within said at least one data trace stream.

19. Apparatus as claimed in claim 17, wherein said trace circuitry is configured to insert synchronisation markers in both said at least one instruction trace stream and said at least one data trace stream when said trace circuitry detects a data element within said at least one data trace stream with a key value corresponding to a position within at least one instruction trace stream earlier than an earliest instruction element within said search space.

20. Apparatus as claimed in claim 17, wherein said trace circuitry is configured to insert synchronisation markers in both said at least one instruction trace stream and said at least one data trace stream when said trace circuitry detects a data element within said at least one data trace stream with a key value corresponding to a position within at least one instruction trace stream earlier than an earliest instruction element within said search space and with a key value matching an instruction element corresponding to a position within said search space later than a most recently generated key value.

21. Apparatus as claimed in claim 17, wherein said trace circuitry is configured to insert synchronisation markers in both said at least one instruction trace stream and said at least one data trace stream when said trace circuitry detects a data element within said at least one data trace stream with a key value corresponding to a position within at least one instruction trace stream later than a latest instruction element within said search space.

22. Apparatus as claimed in claim 18, wherein said trace circuitry is configured to insert synchronisation markers in both said at least one instruction trace stream and said at least one data trace stream when said trace circuitry detects a data element within said at least one data trace stream with a key value corresponding to a position within at least one instruction trace stream later than a latest instruction elements within said search space and with a key value matching an instruction element positioned between an earliest instruction element within said search space and said last matched instruction element.

23. Apparatus as claimed in claim 7, wherein said trace circuitry is configured to insert synchronisation markers in both said at least one instruction trace stream and said at least one data trace stream when one or more program instructions speculatively executed by said processing circuitry are cancelled such that corresponding instruction elements with said at least one instruction trace stream are cancelled.

24. Apparatus for processing data comprising:
processing means for performing processing operations in response to a stream of program instructions;

tracing means coupled to said processing means for generating trace data indicative of said processing operations performed by said processing circuitry; wherein said trace data comprises a plurality of separate trace streams including at least one first trace stream and at least one second trace stream and said tracing means is configured to insert a synchronisation marker in one of said at least one second trace stream to mark a synchronisation point which matches a known point in one of said at least one first trace stream;

wherein, in addition to insertion of said synchronisation marker, said tracing means is configured to mark individual elements within said plurality of separate trace streams with respective key values.

25. A method of processing data comprising the steps of:

performing processing operations in response to a stream of program instructions;

generating trace data indicative of said processing operations performed; wherein said trace data comprises a plurality of separate trace streams including at least one first trace stream and at least one second trace stream and said step of generating inserts a synchronisation marker in one of said at least one second trace stream to mark a synchronisation point which matches a known point in one of said at least one first trace stream, and in addition to inserting of said synchronisation marker, marking individual elements within said plurality of separate trace streams with respective key values.

26. Apparatus for processing received trace data comprising:

receiving circuitry configured to receive trace data from a processing apparatus performing processing operations in response to a stream of program instructions; and analysis circuitry coupled to said receiving circuitry and configured to analyse said trace data; wherein said trace data comprises a plurality of separate trace streams including at least one first trace stream and at least one second trace stream and said analysis circuitry is configured to identify a synchronisation marker in one of said at least one second trace stream and a known point within one of said at least one first data stream, said synchronisation marker and said known point identifying respective synchronisation points with matching positions within said first trace stream and said at least one second trace stream, and in addition to said synchronisation marker, individual elements within plurality of separate trace streams are marked with respective key values.

27. Apparatus for processing received trace data comprising:

receiving means for receiving trace data from a processing apparatus performing processing operations in response to a stream of program instructions; and analysis means coupled to said receiving means for analysing said trace data; wherein said trace data comprises a plurality of separate trace streams including at least one first trace stream and at least one second trace stream and said analysis means is configured to identify a synchronisation marker in one of said at least one second trace stream and a known point within one of said at least one first data stream, said synchronisation marker and said known point identifying respective synchronisation points with matching positions within said one of said at least one first trace stream and said one of said at least one second trace stream, and in addition to said synchronisation marker, individual elements within said plurality of separate trace streams are marked with respective key values.

28. A method of processing received trace data comprising:

receiving trace data from a processing apparatus performing processing operations in response to a stream of program instructions; and analysing said trace data; wherein said trace data comprises a plurality of separate trace streams including a first trace stream and at least one second trace stream and said step of analysing identifies a synchronisation marker in said at least one second trace stream and a known point within one of said at least one first data stream, said synchronisation marker and said known point identifying respective synchronisation points with matching positions within said one of said at least one first trace stream and one of said at least one second trace stream, and in addition to said synchronisation marker, individual elements within said plurality of separate trace streams are marked with respective key values.

* * * * *